US010624042B1

(12) United States Patent
Palatino

(10) Patent No.: US 10,624,042 B1
(45) Date of Patent: Apr. 14, 2020

(54) CALIBRATION ASSEMBLY AND SYSTEM FOR COSITE TRANSCEIVERS

(71) Applicant: BAE SYSTEMS INFORMATION AND ELECTRONIC SYSTEMS INTEGRATION INC., Nashua, NH (US)

(72) Inventor: Christopher A. Palatino, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/227,337

(22) Filed: Dec. 20, 2018

(51) Int. Cl.
*H04W 40/16* (2009.01)
*H04W 52/22* (2009.01)
*H04W 52/32* (2009.01)
*H04W 52/36* (2009.01)
*H04W 52/14* (2009.01)

(52) U.S. Cl.
CPC ....... *H04W 52/228* (2013.01); *H04W 52/143* (2013.01); *H04W 52/325* (2013.01); *H04W 52/365* (2013.01)

(58) Field of Classification Search
CPC ...... H04B 17/309; H04B 17/345; H04B 1/04; H04B 1/0475; H04B 1/18; H04B 1/40; H04B 2001/0416; H04B 2001/7154; H04B 5/02
USPC .................................. 455/63.1, 63.4, 67.13
See application file for complete search history.

(56) References Cited

U.S. PATENT DOCUMENTS

2017/0353210 A1* 12/2017 Pratt ........................ H04B 1/44

OTHER PUBLICATIONS http://www.netcominc.com/co-location-interference-mitigation-otherwise-known-as-cosite-mitigation/, "Co-Location Interference Mitigation; Otherwise Known as Cosite Mitigation," printed Nov. 1, 2018, 7 pages, Netcom Inc., Wheeling, IL.

* cited by examiner

*Primary Examiner* — Tu X Nguyen
(74) *Attorney, Agent, or Firm* — Sand, Sebolt & Wernow LPA; Scott J. Asmus

(57) ABSTRACT

A calibration assembly and system for collocated transceivers includes calibration logic that determines at least one calibration ratio based on the isolation between a transmitter and a receiver on a platform, such as an aerial vehicle, regardless of whether the vehicle is manned or unmanned. The calibration logic utilizes a power level of the signal of interest at the receiver to calibrate a power output level of a transmit signal transmitted from a transmit antenna of the transmitter based on calibration ratios stored in a database. The transmitter then transmits the transmit signal from the transmitter at a power level sufficiently low to prevent a ring-around or wraparound power level from exceeding the power level of the received signal of interest input to the receiver so as to not cause cosite or colocation interference in the receiver.

16 Claims, 4 Drawing Sheets

CALIBRATION ASSEMBLY AND SYSTEM FOR COSITE TRANSCEIVERS

STATEMENT OF GOVERNMENT INTEREST

This invention was made with government support under Subcontract No. 1170366. The government has certain rights in the invention.

TECHNICAL FIELD

The present disclosure relates generally to a device, system, and method for transmitting at least one signal without interfering with receiving a signal. More particularly, the present disclosure relates to calibration logic that determines a power level of a signal received at a receiver and calibrates a power level of a transmitted signal so that ring around or wraparound power levels do not interfere with the signal received at the receiver during transmission of the signal transmitted from the transmitter.

BACKGROUND

Wireless signal applications continue to increase in the commercial and military industries. As such, the number of radio transceivers are increasing and transmitting at higher output power. Some higher output transceivers must operate in the same radio band and use antennas that are in close proximity to other transceivers on a platform. These situations, where multiple radios are in close proximity to each other, may be referred to as co-located (cosite) radios.

Cosite transceivers can create an increased level of system self-interference. Most transceiver systems designed to solve cosite interference, rely on simple receiver frequency or power pre-selection. However, they sometimes do not adequately address cosite self-interference issues. Additionally, some of these transceivers may use low power band pass filtering before the transmitter power amplifier to reduce the undesired spectral content of the exciter. Yet, these methods are proving to be inadequate for current radio networks and other wireless networks.

Radio networks that only use two cosite transceivers typically employ a receiver pre-selector to remove the neighboring transmitter signal from the receiver input. In some cases there is a low-power filter in the nearby transmitter to reduce the sideband interference. In essence, both filters are used to prevent the one transceiver's transmit signal from interfering with the other transceiver's ability to receive a desired remote signal. While this method may be desirable in some situations, it is often only effective under ideal or constant power conditions of the signal received at the receiver. However, power levels of the received signal of interest are not always at a constant power level.

SUMMARY

Issues continue to exist for signals having varying power levels that are received within a wireless communication system with cosite transceivers. More particularly, issues continue to exist with controlling the output power of a communication system having a receive antenna and a transmit antenna. The present disclosure addresses these and other issues by providing a communication system that receives a signal via its receiver antenna (i.e., a receiver) and transmits a signal via its transmit antenna (i.e., a transmitter). The signal that is transmitted from the transmitter is at a different power than the signal received in the receiver.

In one aspect, an exemplary embodiment of the present disclosure may provide a method comprising: determining an isolation value between a transmitter and a receiver that are collocated on a platform; determining at least one calibration ratio based on the isolation between the transmitter and the receiver and storing the at least one calibration ratio in a database; detecting and receiving a signal of interest at a receive antenna of the receiver; determining a power level of the signal of interest at the receiver; determining whether to respond to the received signal of interest; calibrating a power output level of a transmit signal transmitted from a transmit antenna of the transmitter based on calibration ratios stored in the database; and transmitting the transmit signal from the transmitter at a power level sufficiently low to prevent a ring-around or wrap-around power level from exceeding the power level of the received signal of interest input to the receiver. This exemplary embodiment or another exemplary embodiment may further provide wherein calibrating the power output level of the transmit signal is accomplished by attenuating, with a variable attenuator, the power output level of the transmit signal. This exemplary embodiment or another exemplary embodiment may further provide maintaining, responsively, the power output level within 12 dB of the power level of the received signal of interest input to the receiver. This exemplary embodiment or another exemplary embodiment may further provide determining whether the power level of the received signal of interest input to the receiver increases or decreases; wherein if the power level of the received signal of interest input to the receiver increases, then increasing the power output level of the transmit signal without causing the wraparound power to exceed the power level of the received signal of interest input to the receiver; and wherein if the power level of the receive signal of interest input to the receiver decreases, then decreasing the power output level of the transmit signal without causing the wraparound power to exceed the power level of the received signal of interest input to the receiver.

In another aspect, an exemplary embodiment of the present disclosure may provide a calibration assembly in operative communication with a receiver having a receive antenna and a transmitter having a transmit antenna, the calibration assembly comprising: calibration logic coupled to the receiver and the transmitter to responsively maintain a power level of a signal transmitted by the transmit antenna below a power level of a signal received by the receive antenna, wherein the calibration logic responsively maintains a wraparound power generated during transmission of the signal from the transmitter below the power level of the signal received by the receive antenna. This exemplary embodiment or another exemplary embodiment may further provide at least one non-transitory computer readable storage medium having instructions encoded thereon that, when executed by a processor, implement operations to maintain the wraparound power below the power level of the signal received by the receive antenna. This exemplary embodiment or another exemplary embodiment may further provide an isolation value defined by a dimensional distance separating the transmit antenna from the receive antenna on the platform; and a calibration ratio based on the isolation value that is utilized by the processor when executing the instructions to maintain the wraparound power below the power level of the signal received by the receive antenna. This exemplary embodiment or another exemplary embodiment may further provide a power offset between the power level of the transmitter and the signal power of the received signal at the receive antenna. This exemplary embodiment or another exemplary embodiment may further provide an attenuator; a database; where the attenuator varies gain the signal transmitted from the transmit antenna based, at least in part, on calibration ratio established by an isolation value defined by a dimensional distance separating the transmit antenna from the receive antenna on the platform.

In yet another aspect, and exemplary embodiment the present disclosure may provide a platform comprising: a receiver having a receive antenna; a transmitter having a transmit antenna; calibration logic carried by the platform and coupled to the receiver and the transmitter to responsively maintain a power level of a signal transmitted by the transmit antenna below a power level of a signal received by the receive antenna; and a wraparound power generated during transmission of the signal from the transmitter, wherein the calibration logic responsively maintains the wraparound power below the power level of the signal received by the receive antenna. This exemplary embodiment or another exemplary embodiment may further provide at least one non-transitory computer readable storage medium, as part of the calibration logic, having instructions encoded thereon that, when executed by a processor, implement operations to maintain the wraparound power below the power level of the signal received by the receive antenna. This exemplary embodiment or another exemplary embodiment may further provide an isolation value defined by a dimensional distance separating the transmit antenna from the receive antenna on the platform; and a calibration ratio based on the isolation value that is utilized by the processor when executing the instructions to maintain the wraparound power below the power level of the signal received by the receive antenna. This exemplary embodiment or another exemplary embodiment may further provide a power offset, established by the calibration logic, between the power level of the transmitted signal and the signal power of the received signal at the receive antenna. This exemplary embodiment or another exemplary embodiment may further provide wherein the power offset is constant. This exemplary embodiment or another exemplary embodiment may further provide an execution call to initiate the calibration logic to maintain the power offset when the receiver receives the signal received by the receive antenna. This exemplary embodiment or another exemplary embodiment may further provide wherein the execution call is a single execution call. This exemplary embodiment or another exemplary embodiment may further provide wherein the execution call is one of a plurality of execution calls to initiate multiple calibration sequences in response to multiple time periods of varying power levels for the signal received by the receive antenna. This exemplary embodiment or another exemplary embodiment may further provide an attenuator; a database; wherein the attenuator varies gain the signal transmitted from the transmit antenna based, at least in part, on calibration ratio established by an isolation value defined by a dimensional distance separating the transmit antenna from the receive antenna on the platform. This exemplary embodiment or another exemplary embodiment may further provide wherein the wraparound power is within +/−12 decibel (dB) from the power of the signal received at the receive antenna. This exemplary embodiment or another exemplary embodiment may further provide wherein the transmitter and the receiver are legacy components of the platform and the calibration logic includes calibration instructions that are uploaded to a legacy storage medium on the platform to be executed by a legacy processor.

In yet another aspect, and exemplary embodiment the present disclosure may provide a calibration assembly and system for collocated transceivers includes calibration logic that determines at least one calibration ratio based on the isolation between a transmitter and a receiver on a platform, such as an aerial vehicle, regardless of whether the vehicle is manned or unmanned. The calibration logic utilizes a power level of the signal of interest at the receiver to calibrate a power output level of a transmit signal transmitted from a transmit antenna of the transmitter based on calibration ratios stored in a database. The transmitter then transmits the transmit signal from the transmitter at a power level sufficiently low to prevent a ring-around or wraparound power level from exceeding the power level of the received signal of interest input to the receiver so as to not cause cosite or colocation interference in the receiver.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
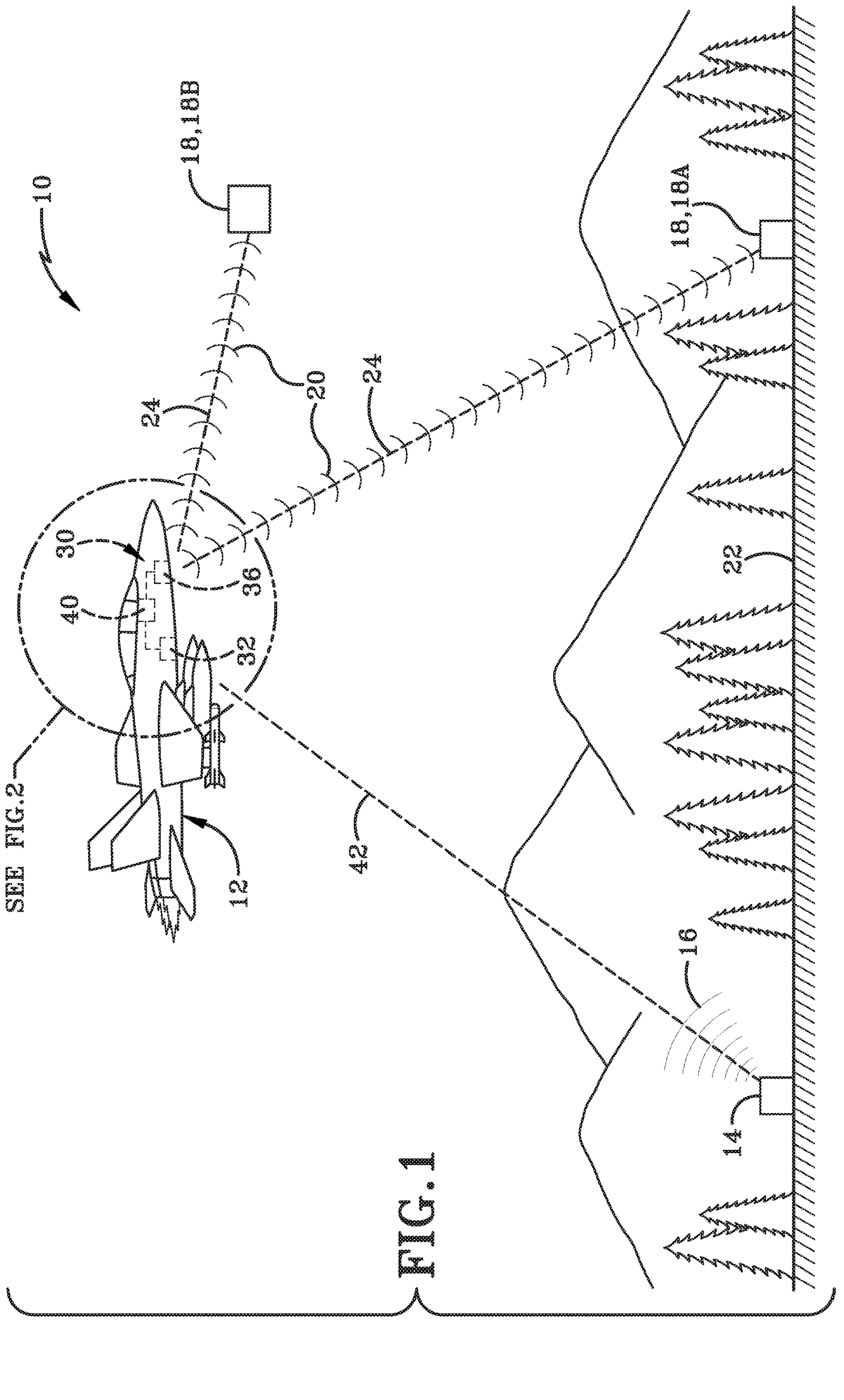
FIG. 1 is a schematic view of a system in accordance with the present disclosure having a platform carrying a calibration assembly in operative communication with a receiver on the platform for receiving one or more signals from a signal source and a transmitter on the platform for transmitting one or more signals to a downstream destination.

A system in accordance with the present disclosure is shown generally at 10. System 10 may include a platform 12, a signal source 14 that generates a signal of interest 16, and at least one downstream device 18 that receives a signal 20 transmitted from the platform 12. As will be described in greater detail below, the system 10 is operative to ensure that the transmitted signal 20 has a transmission power level such that its wrap around power, to the receiver of platform 12, is less than a reception power level of the signal of interest 16 generated from the signal source 14. The transmission power of signal 20 does not wrap back around to create a ring-around power or wraparound power which interferes with a receiver on the platform 12.

Platform 12 may be any manned or unmanned vehicle and may be moveable relative to the ground surface 22. For example, platform 12 may be any aerial vehicle, such as a unmanned aerial vehicle (UAV), a drone, a helicopter or rotorcraft, a fixed wing aircraft, a satellite or the like. However, the platform 12 may also be a land-based vehicle, such as an armored truck, an armored vehicle, an unarmored vehicle, a tank or the like. Additionally, platform 12 may be a floating vessel, such as a ship or a submarine. As will be described in greater detail below, platform 12 carries electronics and other circuitry to effectuate the calibration of a transmission power of the signal 20 transmitted from the platform 12 that is sent to the downstream device 18 in response to receiving and determining a power level of the signal of interest 16 received from the signal source 14.

Signal source 14 may be any device, electrical or otherwise, that generates a signal of interest 16. Signal source 14 is shown schematically in FIG. 1. However, it is to be understood that the signal source 14 may be a land-based signal generator or it may be an aerial-based signal generator. Thus, while the signal source 14 is shown as being positioned on the ground surface 22, it is to be equally understood that the signal source 14 may be located above the ground surface 22. Further, the signal source 14 may generate the signal of interest 16 purposefully or incidentally. For example, if the signal source 14 is a friendly communication device with the platform 12, then the signal of interest 16 may be a purposefully generated communication signal intended to be received by the platform 12. However, if the signal source 14 is a threat to the platform 12, then the signal source 16 may be incidentally generated in response to electrical actions performed by the signal source 14 that the platform 12 needs to be aware. Thus, aspects of the system 10 may be equally applied to commercial communication systems as well as electronic warfare (EW) systems or countermeasure systems for threats to the platform 12. For example, if an enemy to the platform 12 is operating a communication device near the ground surface 22, then the communications of the enemy (signal source 14) with his combatants will incidentally generate the signal of interest 16 that desires to be received and known to the platform 12.

The downstream device 18 may be any electrical device that is configured to receive the signal 20 transmitted from a transmitter on the platform 12. Inasmuch as the downstream device 18 may be any electrical device that utilizes the signal 20, the downstream device 18 can be a land-based or ground-based device, such as device 18A, or another aerial device, such as device 18B. The downstream devices 18A, 18B may receive the signal 20 along a communication link 24 that may through an open medium, such as air. Thus, while one exemplary embodiment depicts that the downstream devices 18, namely, the first device 18A and the second device 18B, are separate and distinct from the platform 12, it is entirely possible for the downstream device 18 to be located on the platform 12. For example, the first downstream device 18A may be a land-based receiver or relay configured to receive the signal 20 from the platform 12 and utilize the information carried by the signal 20 to perform another action. Similarly, the second downstream device 18B may receive the signal 20 and process its instructions accordingly to perform an action. However, the downstream device 18 may additionally be located on the platform 12 and is directly wired through a direct communication link from the transmitter generating the signal 20 on the platform 12 to take an action that is to be performed by the platform 12 or another system on the platform 12.

Figure 2:
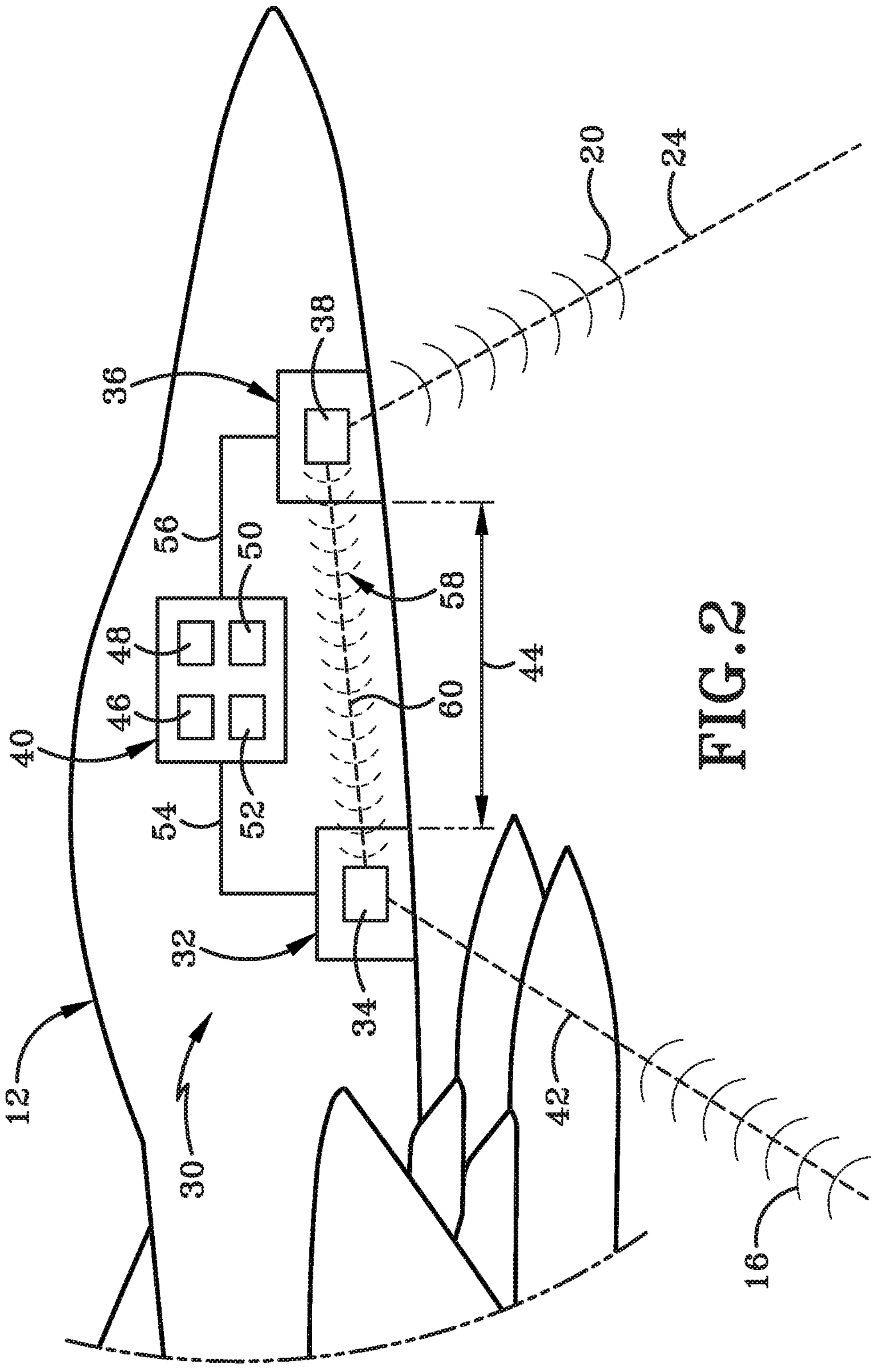
FIG. 2 is an enlarged schematic view of the calibration system on the platform identified by the region labeled "SEE FIG. 2" in FIG. 1.

FIG. 2 is an enlarged schematic view of the platform 12 depicting a calibration system 30 carried by the platform 12. The calibration system 30 includes a receiver 32 having an antenna 34, a transmitter 36 having a transmit antenna 38, and calibration logic 40. The receiver 32 and the transmitter 36 are collocated on platform 12 such that they are considered cosite transceivers.

Receiver 32 is an electrical device or electrical circuitry in operative communication with the receive antenna 34 configured to receive signal 16 through an open-air communication link 42. The receiver 32 may be positioned at any portion of the platform 12. However, it is contemplated that the receiver 32 may position the receive antenna 34 in a manner so as to effectuate reception of the signal 16 from the signal source 14. In one particular embodiment, the receive antenna 34 may be conformal with the outer surface or outer skin of platform 12. Further, receiver 32 may be a pre-existing and legacy receiver on a platform 12. Thus, certain components of the calibration logic 40 which are operably connected with the receiver 32 and its receive antenna 34 may be considered an add-on or a supplemental kit that can supplement a legacy receiver and legacy antenna 34 on pre-existing platforms 12.

Transmitter 36 having transmit antenna 38 may be an electrical device configured to generate and transmit the signal 20 along the communication link 24 to the downstream device 18. Transmitter 36 may be any electrical device that is powered by power generation components on the platform 12 enabling generation and transmission of signal 20. The transmitter 36 may be placed at any location on the platform 12; however, it is envisioned that the transmit antenna 38 will be oriented in a manner so as to effectuate the transmission of signal 20 without significant hindrance by other physical components or hardware on the platform 12. Further, the transmitter 36 and the transmit antenna 38 may be existing or legacy components on the platform 12 such that portions of the calibration logic 40 may be coded into pre-existing memories and utilize pre-existing processors so as to effectuate new and improved functionality of the transmitter 36 during transmission of signal 20 from the transmit antenna 38.

The transmitter 36 is separated on the platform 12 from the receiver 32 by a distance 44. The distance 44 between the receiver 32 and the transmitter 36 defines an amount of isolation for the calibration system 30. As will be described in greater detail below, the isolation, which depends upon the dimensional distance 44, is utilized by the calibration logic 40 as a factor in determining a calibration metric or calibration ratio to reduce a power output of the signal 20 from the transmit antenna 38 such that the wraparound power of the signal 20 does not exceed (i.e., is less than) a power level of the signal 16 received by the receiver 32.

The calibration logic 40 may include a memory or at least one non-transitory computer readable storage medium 46, a processor 48, an attenuator 50, and a database 52. The calibration logic 40 is coupled with the receiver 32 via a link 54, and the calibration logic 40 is coupled to the transmitter 36 via link 56. Link 54 may be any wired or wireless connection that effectuates the transmission of signals containing the power of signal 16 from the receiver 32 to the calibration logic 40. Link 56 may be any wired or wireless communication link that allows the transmission of signals from the calibration logic 40 to the transmitter 36 in order to direct the transmitter 36 to output the transmission signal 20 at a power level that maintains wraparound power or ring-around power less than the power level of the received signal 16.

As will be described in greater detail below, when the transmitter 36 is transmitting signal 20 from the transmit antenna 38, the antenna 38 inherently transmits a wrap-around or ring-around power signal 58. The wraparound power signal 58 travels along an open medium 60 from the transmit antenna 38 to the receive antenna 34. The open medium 60 is based, at least in part, on the dimensional distance 44. The wraparound power signal 58 inherently output from the transmit antenna 38 during the generation of transmit signal 20 can interfere with, or otherwise be considered noise, the receive antenna 34 during its reception of the signal of interest 16. Thus, the calibration logic 40, as will be described in greater detail below, is operative to calibrate the power level output of the transmission signal 20 such that the wraparound power 58 is less than the power input level of the receive signal 16 so as to not create noise that would interfere with the receiver 32 processing the signal 16.

The memory 46 and the processor 48 may be existing hardware and processing components on the platform 12. Accordingly, these portions of the calibration logic 40 may be existing or legacy memory and processing components that can be retrofitted with software or other instructions to accomplish the features of the present disclosure.

In one exemplary embodiment, there may be at least two attenuators 50. A first attenuator is on the receive path to control receiver sensitivity and a second attenuator is on the transmit path to control the power coming out of the transmit antenna Attenuator 50 may be a variable attenuator. One or more of the first and/or second variable attenuator(s) 50 is an electric device or circuit that can decrease the strength of an input signal either continuously or step-by-step without appreciable signal distortion while substantially maintaining a constant impedance match. The variable attenuator 50 may be a continuously variable attenuator or may be a step attenuator. When implemented as a continuously variable attenuator, the attenuator 50 may be connected with any type of connection and any kind of connection gender. When the attenuator 50 is implemented as a step attenuator, it may include any type of connection series and any kind of connection gender. Typically, the attenuation of a circuit inserted into a transmission line is defined as the ratio between decibels of power input to the attenuator and power transmitted from the circuit to the load. The attenuator 50 may be a transmission link component with at least two ports to reduce input power to a system by a predetermined amount. When attenuator 50 is a variable attenuator, it operates through its entire dynamic range, in contrast with a switch attenuator which is generally restricted to one of two states, namely, on or off. The attenuator 50 may be mechanically controlled or electrically controlled. When the attenuator 50 is mechanically variable, it may be adjusted with a tuning screw or a control knob. With an electronically controlled variable attenuator, it may tune the power through either a current controlled manner or a voltage controlled manner. Further, the attenuator 50 may use a pin diode as the control element. Although applicable in some instances for the application being developed only electrically controlled attenuators are used. In one particular embodiment of the present disclosure, digitally controlled attenuators are used to set a voltage on a given pin of the attenuator to enable a specific attenuation amount. Typically these attenuators allow up to 31 dB of attenuation (1 dB, 2 dB, 4 dB, 8 dB, 16 dB attenuation states each have their own enables allowing for 0 to 31 dB of attenuation in 1 dB steps)

The database 52 may be a spreadsheet or a table or other computer accessible program or interface that stores components of the isolation defined by the dimensional distance 44 that will be used to calibrate the transmit signal 20 such that its output power does not create a ring-around power signal 58 that would create noise or distortion to the incoming signal 16 at the receiver 32. The database will further store the calibration metrics or calibration ratios used to responsively maintain the wraparound power 58 below the power level of the received signal 16.

Figure 3A:
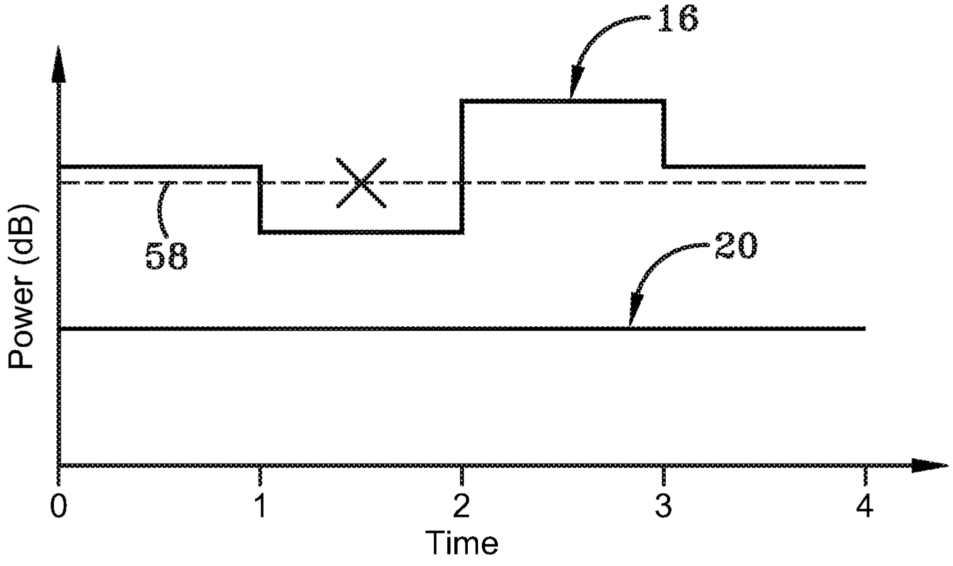
FIG. 3A is an exemplary graph of power level versus time that depicts interference in a signal received by the receiver when wraparound power or ring-around power generated by the transmitter exceeds the power level of the signal received by the receiver.

FIG. 3A depicts an exemplary graph having a time on the X-axis and a power level on the Y-axis. The graph depicts transmit signal 20 as having a constant power level. The receive signal 16 has a varying power level depicted as a stepwise function between each of the time intervals, which are arbitrary. However, when the received signal of interest 16 has a step down in power, such as between time interval T1 to T2, then the ring-around or wraparound power 58 may exceed the power level of the received signal 16. Thus, an "X" represents noise or interference in the received signal 16 during the time interval from T1 to T2 when the ring-around or wraparound power 58 exceeds the power level of the received signal 16. When the power level of the receive signal 16 increases between time interval T2 to T3, because the power level of the transmit signal 20 is constant, the ring-around power 58 remains below the power level of the receive signal 16. Thus, from the interval T2 to T3, there would not be a significant amount of noise or interference in the receive signal 16 caused by interference by the ring-around power 58.

FIG. 3A depicts that the use of a constant power level for the transmit signal 20 is not beneficial as there may be time intervals where the ring-around power 58 exceeds the power level of the received signal 16 (such as in the interval between T1 and T2). Thus, when trying to receive the signal 16 from a signal source, signal 16 can be interrupted and have a significant amount of noise or interference which is difficult to process. Thus, it is advantageous to use calibration logic 40 to vary the transmit power of the transmit signal 20 such that as the input power of the receive signal 16 varies, the transmit power of the transmit signal 20 varies in an identical manner such that the ring-around power is always less than the power level of the receive signal 16. In some instances, the system may notice an inefficiency where the transmit power may have been able to increase without corrupting the input signal.

Figure 3B:
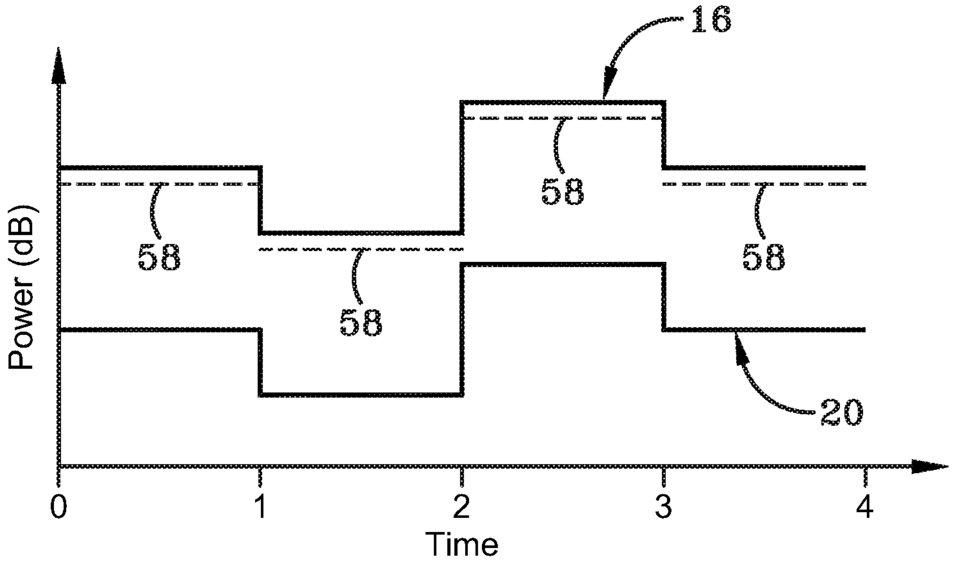
FIG. 3B is an exemplary graph of power level versus time that depicts the calibration assembly responsively maintaining the wraparound power or ring-around power generated by the transmitter below the power level of the signal received by the receiver

FIG. 3B embodies a graph in which the power level of the transmit signal 20 varies in response to the power level of the receive signal 16 changing. For example, the receive signal 16 has a power level in the time interval from T0 to T1. In this same interval from T0 to T1, the power level of the transmit signal 20 is less than the power level of the receive signal 16. The ring-around power 58 is below the power level of the receive signal 16. In the next time interval from T1 to T2, the power level of the receive signal 16 steps down. The power level of the transmit signal 20 steps down in a similar manner in the same time interval from T1 to T2. Based on this step down in power in the power level of the transmit signal 20, the ring-around or wraparound power 58 remains below the power level of the received signal 16 in the time interval T1 to T2. In the next time interval from T2 to T3, the power level of the receive signal 16 steps up and the power level of the transmit signal 20 steps up accordingly. However, during the time interval from T2 to T3, the power level of the transmit signal 20 does not increase to a level where the wrap-around power 58 would exceed the power level of the receive signal 16. As such, the amount in which the power level of transmit signal 20 increases may mirror or be a ratio of the amount that the power level of the receive signal 16 increases in a corresponding time interval such that the wrap-around power 58 is less than the power level of the receive signal 16. A similar pattern follows from time T3 onward and maintains the ring-around power 58 at a level below the power of the receive signal 16.

Through the use of calibration logic 40, the ring-around power 58 is able to be maintained at a power level of about 12 decibels (dB) less than the power level of the receive signal 16. In one particular embodiment, this is an improvement over conventional isolation-based signal transmission systems which typically need about +/−3 dBs of uncertainty.

Figure 4:
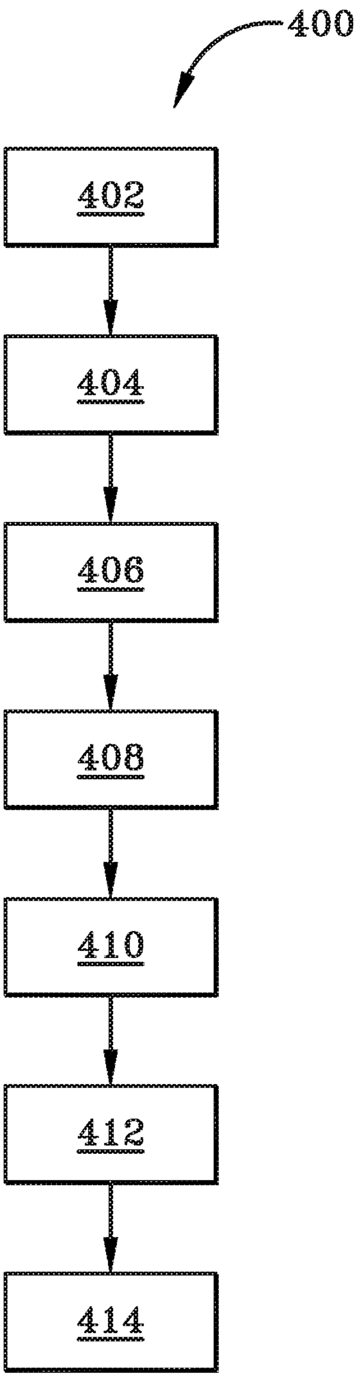
FIG. 4 is a flow chart depicting an exemplary method of the present disclosure.

FIG. 4 depicts a method of calibrating a power level of a transmission signal in response to the power level of an incoming signal generally at 400. Method 400 may include determining the isolation between the transmitter 36 and the receiver 32 which is shown generally at 402. Method 400 may include determining calibration ratios based on the isolation between the transmitter 36 and the receiver 32 and storing the calibration ratios in a database 52, which is shown generally at 404. Method 400 may include detecting and receiving a signal of interest 16 at the receive antenna 34, which is shown generally at 406. Method 400 may include determining a power level of the signal 16 at the receiver 32, which is shown generally at 408. Method 400 may include determining whether to respond to the received signal 16, which is shown generally at 410. Method 400 may include calibrating a power output level of the transmitted signal 20 from the transmit antenna 38 based on calibration ratios stored in the database, which is shown generally at 412. Method 400 may include transmitting the signal 20 from the transmitter 36 at a power level sufficiently low to prevent a ring-around or wrap-around power level 58 from exceeding the input power level of the received signal 16, which is shown generally at 414.

Having thus described some general aspects of the configuration and implementation of the calibration system 30 as it relates to the overall system 10, reference will further be made to additional examples and additional operational features thereof.

When a signal is being transferred at a higher power, there is an aircraft/platform isolation between the transmit antenna 38 and the receive antenna 34. The transmit power wraps back into the receive antenna 34 at change in the power (ΔPower or ΔP) based on the isolation between the transmit antenna 38 and the receive antenna 34. Thus, the receive antenna 34 is receiving a signal at an input power and the transmit antenna 38 is transmitting a signal at a transmit power that wraps around or is a ring-around power 58 that is inherently received by the receive antenna 34 based on the close proximity of the two antennas to each other. Thus, the system of the present disclosure ensures that transmit power that is ringing back to the receive antenna 34 is at a lower power level than the signal being received by the receive antenna 34. This is required so that the input signal may be readily observed by the receive antenna 34.

In accordance with one aspect of the present disclosure, the system 10 calibrates the output of the transmit antenna 38 or transmit path such that the system 10 knows what power is being output by the transmitter (i.e., the transmit antenna 38) so that the wrap-around power or ring-around power 58 that interferes with the receive antenna 34 never exceeds the incoming power level of the signal received by the receive antenna 34. For example, as depicted in FIG. 3B, if the input signal received by the receive antenna 34 increased in power by one decibel (dB), such as between time interval T1 and T2, then the output power of the transmit antenna 38 similarly increases by one dB. In this example, if the output power from the transmitter 36 increased by two (2 dB), then the ring-around power 58 might come in higher to the receive antenna 34 than the incoming signal, such as what is shown in FIG. 3A. As such, it would be too high and the signal may not be properly observed by the receive antenna 34 (i.e., the receiver 32). The present disclosure calibrates the output of the transmit antenna 38 to a level that does not exceed the incoming power level of the signal received by the receive antenna 34.

In accordance with another aspect of the present disclosure, the system 10 utilizes calibration techniques via calibration assembly 30 to account for the ring around or wrap-around power 58 from the transmit antenna 38 to ensure that the ring around power 58 is less than the incoming signal power received by the receive antenna 34. According to one aspect, one exemplary reason for the transmit signal wrapping around to the receive antenna 34 is based on the close proximity of the receive antenna 34 to the transmit antenna 36 on the platform 12. This is because as the receive antenna 34 is operating, it is capturing the output transmit signals from the transmit antenna 38 based on their proximity to the receive antenna 34. Ring around or wrap-around power 58 from the transmit antenna 38 acts as interference on the receive antenna 34. Thus, the ring around power 58 should be less than the incoming power of the signal at the receive antenna 34 so as to not interfere therewith. As the input signal moves up and down in power, the system 10 of the present disclosure responsively maintains and ensures that the output power of the transmit signal correspondingly moves up and down in power such that the ring around power 58 of the output signal does not exceed the power level of the incoming signal to the receive antenna 34.

Thus, the calibration system 30 of the present disclosure maintains a power offset between transmit power of the transmitter 36 and the received signal power at the receive antenna 34, as best shown in FIG. 3B. For example, if a signal source is generating a signal that is located only about 100 feet from the receive antenna 34, then the receive antenna 34 is able to receive a higher power level of the incoming signal. However, if the signal source is spaced a great distance, such as two miles away from the receive antenna 34, then the power level that the receive antenna 34 receives is lower. This is because the power of the signal is spreading more power over a greater volume so the power density is lessened at that point. So the change in power at the receive antenna 34 is what is monitored by the power level detection logic which then provides the identified power level to the calibration logic 40. Then, the calibration logic 40 calibrates the output path of the transmitter 36 such that the ring around power 58 does not interfere with the incoming signal. By calibrating the transmit path and adjusting the transmit path based on what the receiver antenna 34, namely, the power level of the signal that the receiving antenna 34 is receiving, the calibration system 30 can prevent ring around interference in the incoming signal.

The isolation between the transmit antenna 38 and the receive antenna 34 may be better exemplified through a non-limiting example. In this example, a transmitter 36 or transmit antenna 38 outputs a power of +20 units such as 20 dBm. In this example, there may be 100 dB of isolation between the transmitter 36 and the receiver 32. This refers to the transmit power from the view of the receiver being down or lower by 100 dB. Thus, if the transmitter 36 is transmitting at +20 units, then the receiver 32 observes the transmit signal at −80 units (+20 minus 100=−80 units). The manner in which the receive antenna 34 or receiver 32 observes the different power signal is based on the directiveness of the transmitter 36. Because the transmitter may be a directional antenna, the primary wedge or primary lobe of the transmitter is directed in a different direction than the receiver and the receiver is observing side lobes or back lobes thereof. In furtherance to this example, the receive antenna 34 may be picking up the ringaround or wraparound power 58 signal in one of its side lobes that generated from the back lobe of the transmitter 36. Ideally, the isolation between the transmitter 36 and the receiver 32 should be as high as possible. However, most aircraft or platforms do not have sufficiently high isolation between the transmitters and the receivers. Thus, the present disclosure accounts for low isolation by calibrating the output power of the transmitter 36 so that there is less error in what is transmitting and simultaneously does not interfere with the signal received by the receiver 32. The system of the present disclosure enables an aircraft to transmit more power since the system will know exactly what power to transmit at without interfering or interrupting the signals received by the receiver. For example, the system maintains a ring-around or wraparound power offset.

In this non-limiting example of maintaining a ring-around power 58 offset, an exemplary offset may equal ten dB. Further, if there are 3 dB of uncertainty in the transmit power, then the calibration system 30 will target a ring-around power 58 of at least 13 dB down. Traditional systems utilize uncertainties looked up through a database or a lookup table. However, the system of the present disclosure can eliminate the three dB uncertainty that is identified by the lookup table or the database of the prior art systems and can now be within one-half dB uncertainty. Thus, the calibration techniques of the present disclosure eliminate traditional uncertainty errors that were put into prior art systems by not calibrating the transmitter output power to the receiver input power.

The calibration may be performed at the start of a signal detection sequence by the receiver 32 through an execution call stored in instructions in the storage medium 46 that is executed by the processor 48. For example, if the receiver 32 detects a signal incoming at a first power level and the calibration system 30 determines that it wants to respond to the received signal, then the calibration technique of the present disclosure may be initiated. Stated otherwise, the calibration technique is initiated in response to a determination that a received signal at a first power level should be responded to. In each instance, the calibration sequence is initiated after detecting the signal because prior to detecting the signal, the system would not know what the RF performance of the incoming signal is at a given frequency versus the temperature and other environmental factors that the signal is in. Because the RF performance varies with temperature and frequency, the calibration technique is most efficiently performed after receiving the signal. Though it would be possible to do the calibration technique beforehand, a significant amount of calculations would be necessary to account for each environmental and frequency variable for potential incoming signals. Thus, by doing the calibration technique in real time after receiving the signal before sending the transmit signal from the transmitter 36, the calibration system 30 of the present disclosure may eliminate the uncertainty error and may decrease the amount of calibration work that would be required upfront if every variable was pre-accounted for.

The calibration system 30 may be implemented a single time or it may be a dynamic system that continuously updates. In one particular embodiment, when the calibration system 30 is a single one-time calibration, an exemplary scenario would refer to when the calibration system 30 is responding to the incoming signal for a short period of time, for example, less than about one or two minutes. Thus, there is not much variation in temperature over that time period. If the incoming signal changes in frequency during this time period, then the calibration technique must be rerun or updated. The short response times often relate to the mission of the aircraft pertaining to engagement of an external object, such as another enemy aircraft or an incoming enemy threat.

The calibration system 30 and calibration technique of the present disclosure optimizes gain by having variable attenuators 50 that change what the gain is by clicking in loss into the calibration system 30. More particularly, the variable attenuators 50 click in loss to the RF path of the signal. The calibration system 30 adjusts the attenuation levels of the variable attenuators 50 to increase the attenuation. By increasing the attenuation, the calibration system 30 is adjusting the drive power to the final amplifier at the transmitter 36. By changing the power level going into the transmitter 36, the calibration system 30 is able to obtain different output powers. Stated otherwise, if the input power changes, then the output power changes for the transmitter 36. As the calibration system 30 is adjusting the power entering the transmitter 36, the variable attenuator 50 is clicking in 1 dB of loss from the variable attenuator 50. As the input drive level changes, the calibration system 30 monitors the output power of the transmitter 36. Thus, if the input power is changed by the variable attenuator 50 at a level of 5 dB and the output power changes by 5 dB as well, then this relationship is used in performing the calibration as the calibration constant. However, the 5 dB input change may result in a one dB output change. In this instance, this would reflect the calibration constant used to calibrate the calibration system 30. Fundamentally the calibration system 30 is characterizing the nonlinear output of the transmitter 36 based on transmit attenuation settings. The calibration system 30 will determine the transmit attenuation settings to linearize the output power. For example if the calibration system 30 wanted to transmit the peak power it may require 10 dB of attenuation. If calibration system 30 wanted to transmit peak power-2 dB then it might require 6 dB of attenuation due to the nonlinearity of the transmitter 36. Thus, the calibration characterizes what variable attenuator 50 setting is needed to achieve a given output power level of the transmitter 36. Settings characterize the calibration ratio (which may be variable or constant) for each particular instance that the calibration system 30 is executed. Once the calibration ratio is determined, then it is provided to or loaded into a calibration table. The calibration system 30, via firmware, determines how to move the output power by a given dB, for example, 1 dB or 2 dB, based on the calibration table containing the calibration ratio or the calibration constant. Thus, the calibration system 30 is able to identify what the transmit output change needs to be based on a corresponding input power level at that time and temperature and other variable external conditions that the receiver 32 has received an input signal. Stated otherwise, the calibration system 30 loads the calibration ratio into the calibration table into firmware and the calibration system 30 controls the output path such that if the input signal goes up by some amount, then the system changes the output power of the transmitter 36 by a corresponding amount in an autonomous way by looking up what the calibration is based on the results of the calibration test previously performed. In one particular embodiment, the calibration test may be accomplished in about 100 microseconds or less.

With respect to optimizing the calibration system 30 gain, the calibration system 30 of the present disclosure enables uncertainty levels of transmit signals to be reduced. In previous systems, when the transmit signal had a three dB uncertainty, then the transmit needed to be 15 dB less than the receive signal, the overall power of the transmit signal would be need to be 12 dB less so that ring-around or wrap-around power would not interfere with the received signal. The system of the present disclosure enables the uncertainty level to be decreased because of previous uncertainties in conventional systems. By doing the calibration real time, the calibration system 30 is within one dB (+/−0.5 dB) of the desired output power.

The isolation between the transmitter 36 and the receiver 32 is not always a fixed number. In some instances, the isolation between the transmitter 36 and the receiver 32 is variable and may be calculated or calibrated using a separate set of calibration techniques. The isolation level can be calculated after the calibration system 30 of the present disclosure calibrates the transmit power output path. Then the transmitter 36 transmits a signal at a known power level. Then the isolation calibration technique will receive the known transmitted signal at the receiver 32. The receiver 32 receives the known isolation test signal. Then the isolation calibration system may use the received signal strength to determine the isolation in real time between the transmitter 36 and the receiver 32. The system of the present disclosure uses the isolation to determine what the offset between the transmit signal power level and the received signal power level is based on the isolation. Stated otherwise, the isolation is used and the ring-around power 58 is subtracted therefrom to determine what the transmit power needs to be. For example, an exemplary equation may be transmit power from the transmitter 36 equals isolation minus ring-around or wrap-around power 58 from the transmitter 36. For example, if the signal is transmitting at a level of −60 and it is desired to have 100 dB of gain, then the desired output power is +40. However, if there was only 90 dB of isolation, then (if the transmitter is transmitting at +40) the ring-around would be −50, which is 10 dB higher than the input signal. This would interrupt and interfere with the received signal and not be sufficient. The system would need to use the 90 dB of isolation with the input signal at −60 dB and the ring-around power to be 12 dB below the input power, then the ring-around would need to be at −70 dB. With 90 dB of isolation and a −70 ring-around power, then the transmit power would have to be +20 dB.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

As used herein, the terms "ring-around power 58" or "wraparound power 58" refer generally to the transmit interference of the transmit signal interfering with the incoming signal received at the receive antenna. The wraparound power in accordance with the present disclosure must be less than the power level of the incoming signal.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A platform comprising:

a receiver having a receive antenna;

a transmitter having a transmit antenna;

a calibration logic carried by the platform and coupled to the receiver and the transmitter to responsively maintain a power level of a signal transmitted by the transmitter to the transmit antenna below a power level of a signal from the receive antenna received by the receiver;

a wraparound power generated during transmission of the signal from the transmitter, wherein the calibration logic responsively maintains the wraparound power below the power level of the signal received by the receive antenna; and a constant power offset, established by the calibration logic, between the power level of the transmitted signal and the signal power of the received signal from the receive antenna received by the receiver.

2. The platform of claim 1, further comprising:

at least one non-transitory computer readable storage medium, as part of the calibration logic, having instructions encoded thereon that, when executed by a processor, implement operations to maintain the wraparound power below the power level of the signal from the receive antenna received by the receiver.

3. The platform of claim 2, further comprising:

an isolation value defined by a dimensional distance separating the transmit antenna from the receive antenna on the platform; and a calibration ratio based on the isolation value that is utilized by the processor when executing the instructions to maintain the wraparound power below the power level of the signal from the receive antenna received by the receiver.

4. The platform of claim 1, further comprising:

an execution call to initiate the calibration logic to maintain the power offset when the receiver receives the signal from the receive antenna.

5. The platform of claim 4, wherein the execution call is a single execution call.

6. The platform of claim 4, wherein the execution call is one of a plurality of execution calls to initiate multiple calibration sequences in response to multiple time periods of varying power levels for the signal received by the receive antenna.

7. The platform of claim 1, wherein the calibration logic includes:

an attenuator;

a database;

wherein the attenuator varies gain the signal transmitted from the transmit antenna based, at least in part, on calibration ratio established by an isolation value defined by a dimensional distance separating the transmit antenna from the receive antenna on the platform, and wherein calibration ratios are stored in the database.

8. The platform of claim 1, wherein the wraparound power is within +/−0.5 decibel (dB) from the power of the signal received at the receive antenna.

9. The platform of claim 1, wherein the transmitter and the receiver are legacy components of the platform and the calibration logic includes calibration instructions that are uploaded to a legacy storage medium on the platform to be executed by a legacy processor.

10. A calibration assembly in operative communication with a receiver having a receive antenna and a transmitter having a transmit antenna, the calibration assembly comprising:

a calibration logic comprising:

an attenuator; and a database storing calibration ratios, wherein the calibration logic is coupled to the receiver and the transmitter to responsively maintain a power level of a signal transmitted by the transmitter to the transmit antenna below a power level of a signal from the receive antenna received by the receiver, wherein the calibration logic further comprises at least one non-transitory computer readable storage medium having instructions encoded thereon that, when executed by a processor, implement operations and responsively maintains a wraparound power generated during transmission of the signal from the transmitter below the power level of the signal from the receive antenna received by the receiver, and wherein the attenuator varies a gain of the signal transmitted from the transmit antenna based, at least in part, on the calibration ratios established by an isolation value defined by a dimensional distance separating the transmit antenna from the receive antenna on the platform.

11. The calibration assembly of claim 10, wherein the calibration logic further includes:

an isolation value defined by a dimensional distance separating the transmit antenna from the receive antenna on the platform; and a calibration ratio based on the isolation value that is utilized by the processor when executing the instructions to maintain the wraparound power below the power level of the signal received by the receive antenna.

12. The calibration assembly of claim 10, wherein the calibration logic defines a power offset between the power level of the transmitter and the signal power of the received signal at the receive antenna.

13. A method comprising:

determining an isolation value between a transmitter and a receiver that are collocated on a platform;

determining at least one calibration ratio based on the isolation between the transmitter and the receiver and storing the at least one calibration ratio in a database;

detecting and receiving a signal of interest at a receive antenna of the receiver;

determining a power level of the signal of interest at the receiver;

determining whether to respond to the received signal of interest;

calibrating a power output level of a transmit signal transmitted from a transmit antenna of the transmitter based on calibration ratios stored in the database; and transmitting the transmit signal from the transmitter at a power level sufficiently low to prevent a ring-around or wrap-around power level from exceeding the power level of the received signal of interest input to the receiver.

14. The method of claim 13, wherein calibrating the power output level of the transmit signal is accomplished by attenuating, with a variable attenuator, the power output level of the transmit signal.

15. The method of claim 14, further comprising:

maintaining, responsively, the power output level within 1 dB of the power level of the received signal of interest input to the receiver.

16. The method of claim 15, further comprising:

determining whether the power level of the received signal of interest input to the receiver increases or decreases;

wherein if the power level of the received signal of interest input to the receiver increases, then increasing the power output level of the transmit signal without causing the wraparound power to exceed the power level of the received signal of interest input to the receiver; and wherein if the power level of the receive signal of interest input to the receiver decreases, then decreasing the power output level of the transmit signal without causing the wraparound power to exceed the power level of the received signal of interest input to the receiver.

* * * * *